(12) United States Patent
Chatot et al.

(10) Patent No.: US 11,672,378 B2
(45) Date of Patent: Jun. 13, 2023

(54) OVEN BASED NON-POWERED ACCESSORY SYSTEM

(71) Applicant: WHIRLPOOL CORPORATION, Benton Harbor, MI (US)

(72) Inventors: Brian P. Chatot, St. Joseph, MI (US); Christopher D. Cullen, Stevensville, MI (US); Timothy A. Mayberry, St. Joseph, MI (US); Jason Schneemann, St. Joseph, MI (US); Mary A. Watson, Michigan City, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 428 days.

(21) Appl. No.: 16/879,888

(22) Filed: May 21, 2020

(65) Prior Publication Data

US 2020/0281401 A1    Sep. 10, 2020

Related U.S. Application Data

(63) Continuation of application No. 15/215,925, filed on Jul. 21, 2016, now Pat. No. 10,702,098.

(51) Int. Cl.
*A47J 37/06*     (2006.01)
*A47J 36/24*     (2006.01)
*F24C 15/16*     (2006.01)

(52) U.S. Cl.
CPC ....... *A47J 37/0664* (2013.01); *A47J 36/2494* (2013.01); *F24C 15/16* (2013.01)

(58) Field of Classification Search
CPC ..... F24C 15/16; A47J 36/2494; A47J 37/0664
See application file for complete search history.

(56) References Cited

U.S. PATENT DOCUMENTS

| | | | |
|---|---|---|---|
| 620,927 A * | 3/1899 | Hobby | F24C 15/16 126/339 |
| 3,063,441 A | 11/1962 | Stoligrosz | |
| 4,092,909 A | 6/1978 | Phillips | |
| 4,131,109 A | 12/1978 | Coxon et al. | |
| 4,535,229 A | 8/1985 | Wolf et al. | |
| 4,640,265 A | 2/1987 | Romo | |
| 4,706,832 A | 11/1987 | Citino | |
| 5,090,476 A * | 2/1992 | Immel | H05K 7/20609 62/150 |
| 5,287,798 A | 2/1994 | Takeda | |

(Continued)

FOREIGN PATENT DOCUMENTS

| | | | |
|---|---|---|---|
| EP | 1994828 A2 * | 11/2008 | ............... A21B 3/04 |
| EP | 1994828 A2 | 11/2008 | |
| EP | 2615380 A1 | 7/2013 | |

*Primary Examiner* — Dana Ross
*Assistant Examiner* — Kuangyue Chen
(74) *Attorney, Agent, or Firm* — Price Heneveld LLP

(57) ABSTRACT

A cooking assembly includes a grill rack having a peripheral portion defined by a plurality of laterally extending wires bound by a peripheral frame. An inner retention portion is defined by a plurality of laterally extending wires generally co-planar with the plurality of laterally extending wires of the peripheral portion. The inner retention portion includes a retention border adapted to removably engage the drip tray. A drip tray is configured to removably engage the retention border, thereby securing the drip tray laterally. One of a searing pan and a cooking stone is configured to be received in the drip tray.

13 Claims, 8 Drawing Sheets

(56) References Cited

U.S. PATENT DOCUMENTS

| | | | |
|---|---|---|---|
| 5,490,452 A | 2/1996 | Schlosser et al. | |
| 5,562,023 A | 10/1996 | Harrison | |
| 5,848,691 A | 12/1998 | Morris et al. | |
| 5,970,855 A | 10/1999 | Patterson et al. | |
| 6,262,399 B1 | 7/2001 | Lau et al. | |
| 6,463,844 B1 | 10/2002 | Wang et al. | |
| 6,640,695 B2 | 11/2003 | Stark | |
| 7,372,000 B2 | 5/2008 | Stockley | |
| 8,176,842 B2 * | 5/2012 | Baker | A47J 37/01 99/422 |
| 8,430,087 B2 | 4/2013 | Johnston et al. | |
| 8,499,944 B2 | 8/2013 | Parks et al. | |
| D691,846 S | 10/2013 | DeMaio | |
| 8,813,740 B2 | 8/2014 | Linton | |
| 9,033,181 B2 | 5/2015 | Feriola et al. | |
| 9,820,608 B2 | 11/2017 | Kessell | |
| 2005/0051157 A1 | 3/2005 | Cuomo | |
| 2005/0224064 A1 | 10/2005 | Stockley | |
| 2006/0137543 A1 | 6/2006 | McLemore et al. | |
| 2006/0185531 A1 | 8/2006 | Torre | |
| 2013/0206127 A1 * | 8/2013 | Bugg, Jr. | A47J 37/0781 126/43 |
| 2015/0000534 A1 | 1/2015 | Hager et al. | |
| 2015/0076158 A1 | 3/2015 | Tingley | |
| 2016/0095469 A1 | 4/2016 | Gregory et al. | |
| 2018/0020873 A1 | 1/2018 | Chatot et al. | |

\* cited by examiner

US 11,672,378 B2

OVEN BASED NON-POWERED ACCESSORY SYSTEM

CROSS-REFERENCE TO RELATED APPLICATION

This application is a continuation of U.S. patent application Ser. No. 15/215,925, filed on Jul. 21, 2016, and entitled "OVEN BASED NON-POWERED ACCESSORY SYSTEM," now U.S. Pat. No. 10,702,098, issued on Jul. 7, 2020, the entire disclosure of which is incorporated herein by reference.

BACKGROUND OF THE DISCLOSURE

The present disclosure generally relates to non-powered cooking accessories for use with ovens, and more particularly to non-powered cooking accessories for use with ovens.

SUMMARY OF THE DISCLOSURE

One aspect of the present disclosure includes a cooking assembly. A grill rack includes a peripheral portion defined by a plurality of laterally extending wires bound by a peripheral frame. An inner retention portion is defined by a plurality of laterally extending wires generally co-planar with the plurality of laterally extending wires of the peripheral portion. The inner retention portion includes a retention border adapted to removably engage the drip tray. A drip tray is configured to removably engage the retention border, thereby securing the drip tray laterally. One of a searing pan and a cooking stone is configured to be received in the drip tray.

Another aspect of the present disclosure includes a cooking assembly. A grill rack includes a peripheral portion defined by a plurality of laterally extending wires bound by a peripheral frame. An inner retention portion is defined by a plurality of laterally extending wires generally co-planar with the plurality of laterally extending wires of the peripheral portion. The inner retention portion includes a retention border adapted to removably engage the drip tray. A drip tray is configured to removably engage the retention border, thereby securing the drip tray laterally. A searing pan is removably coupled with the drip tray and includes a temperature gauge.

Yet another aspect of the present disclosure includes a cooking assembly. A grill rack includes a predefined retention portion. A drip tray is configured to engage the predefined retention portion, thereby securing the drip tray laterally. One of a searing pan and a cooking stone is configured to be received in the drip tray.

These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which.

DESCRIPTION OF THE EMBODIMENTS

Figure 1:
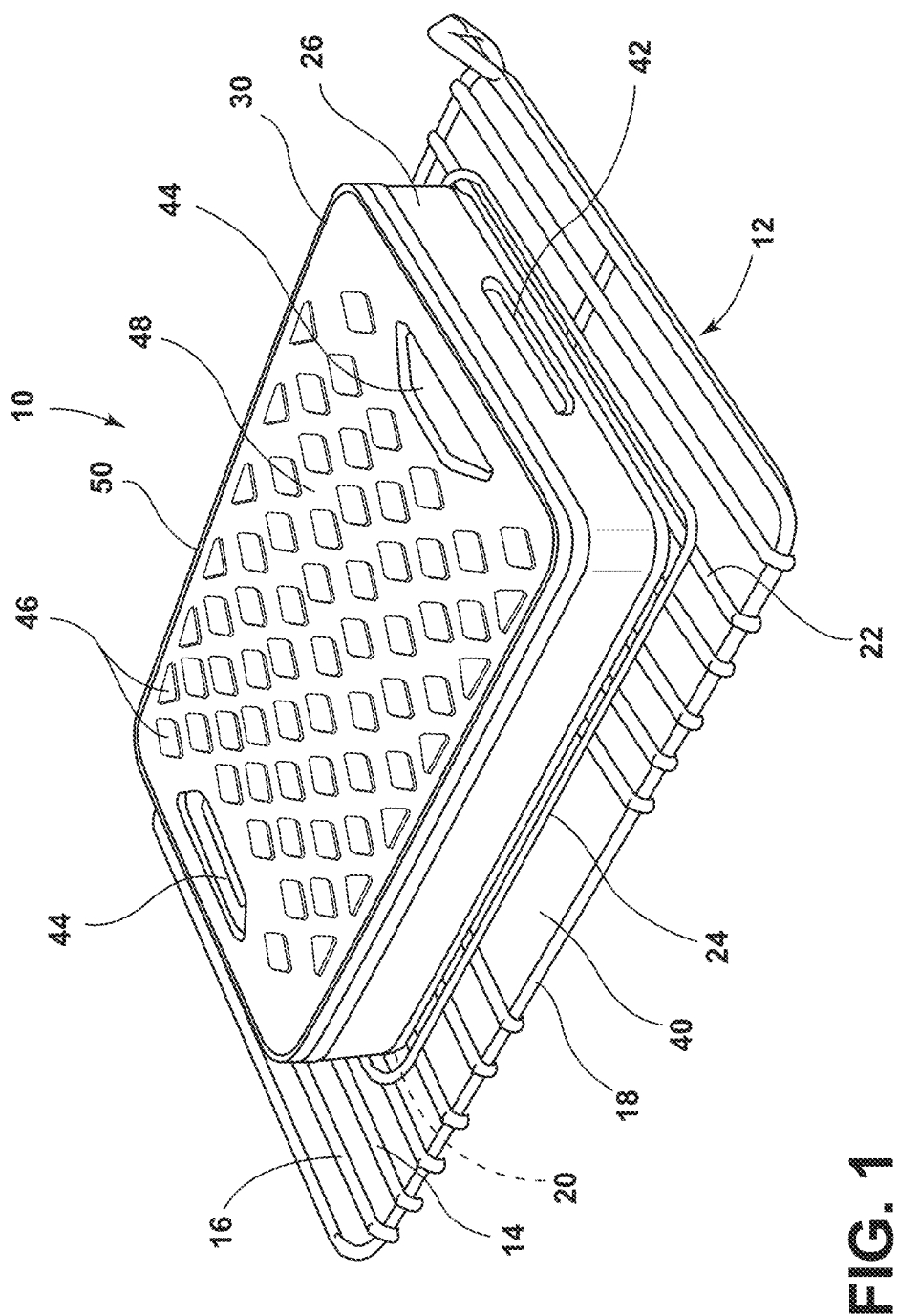
FIG. 1 is a top perspective view of an oven based non-powered accessory system of the present disclosure.

The present illustrated embodiments reside primarily in combinations of method steps and apparatus components related to a display mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-5, reference numeral 10 generally illustrates a cooking assembly designed for use in an oven. The cooking assembly 10 includes a grill rack 12 having a peripheral portion 14 defined by a plurality of laterally extending wires 16 bound by a peripheral frame 18. An inner retention portion 20 is defined by a plurality of laterally extending wires 22 generally co-planar with the plurality of laterally extending wires 16 of the peripheral portion 14. The inner retention portion 20 includes a retention border 24. A drip tray 26 is configured to removably engage the retention border 20, thereby securing the drip tray 26 laterally. One of a searing pan 30 and a cooking stone 32 is configured to be received in the drip tray 26.

With reference again to FIGS. 1 and 2, the cooking assembly 10 is generally configured to be used in an oven for cooking food goods. The construction of the cooking assembly 10 is generally designed to simulate cooking on a grill, cooking in a hearth, or in a stone/brick oven. As shown in FIG. 1, the grill rack 12 includes a generally planar configuration and may include a space 40 designed to allow easy insertion and withdrawal of the grill rack 12 into an oven. In this instance, a portion of the peripheral frame 18 acts as a handle. In addition, the drip tray 26 is configured to be received in the inner retention portion 20 to prevent lateral movement of the drip tray 26 forward and rearward or from side to side. It is generally contemplated that the drip tray 26 may include handles 42, which may be aligned with and used in concert with handles 44 of the searing pan 30.

The searing pan 30 includes a generally planar construction and may include a plurality of raised cooking surfaces 46 that extend upwardly from a body portion 48 of the searing pan 30. In addition, the searing pan 30 includes a raised edge 50 configured to minimize dripping of juices from food goods disposed on the searing pan 30 during cooking. Further, the searing pan 30 may include an open matrix of drip openings to allow juices to flow away from the food goods.

Figure 2:
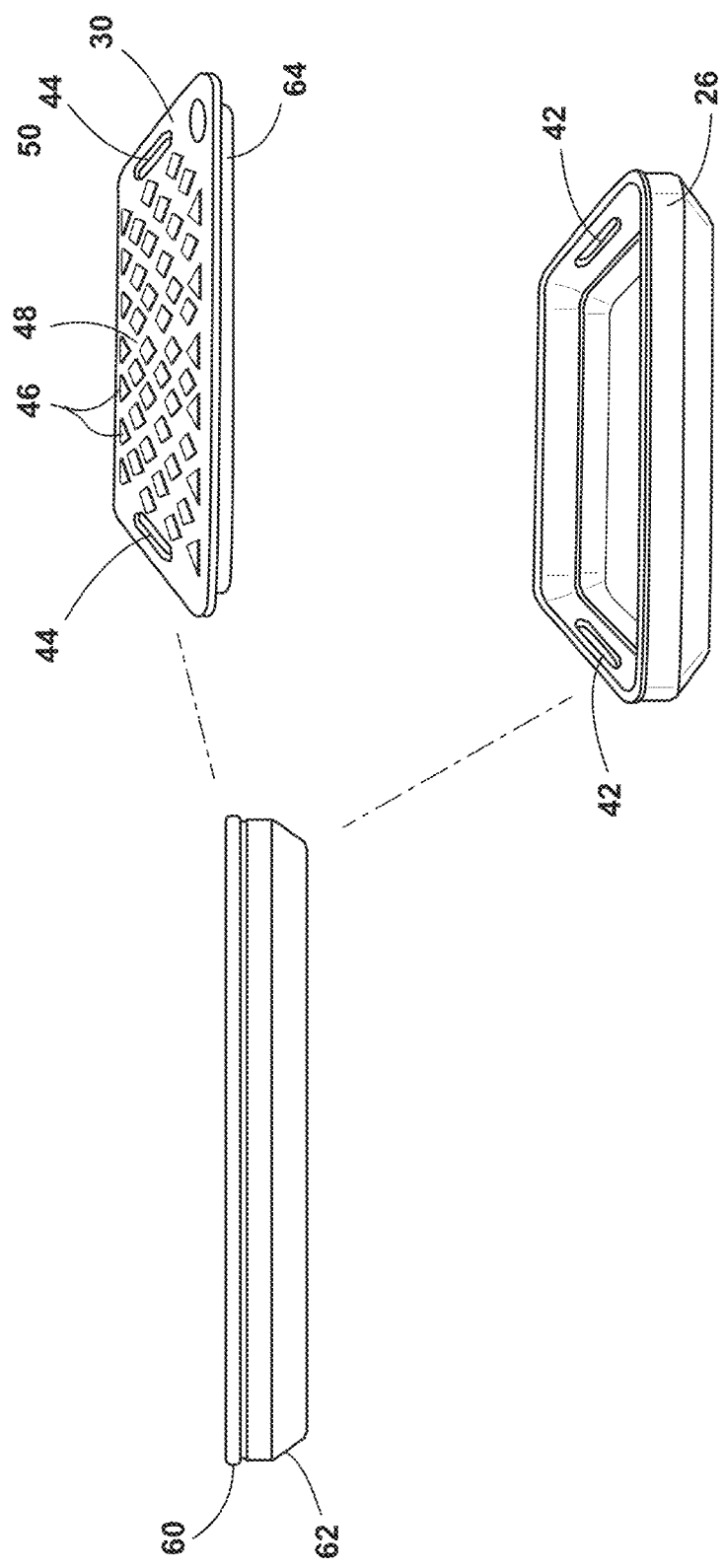
FIG. 2 is a front exploded perspective view of a non-powered accessory system of the present disclosure.

With reference to FIG. 2, the drip tray 26 may include a bulbous rim 60 and an angled or chamfered lower edge 62 configured to be received within the inner retention portion 20. The searing pan 30 may include a lower engagement member 64 configured to engage the bulbous rim 60 of the drip tray 26. The engagement of the lower engagement member 64 with the bulbous rim 60 ensures that the searing pan 30 maintains position within the drip tray 26 during use.

Figure 3:
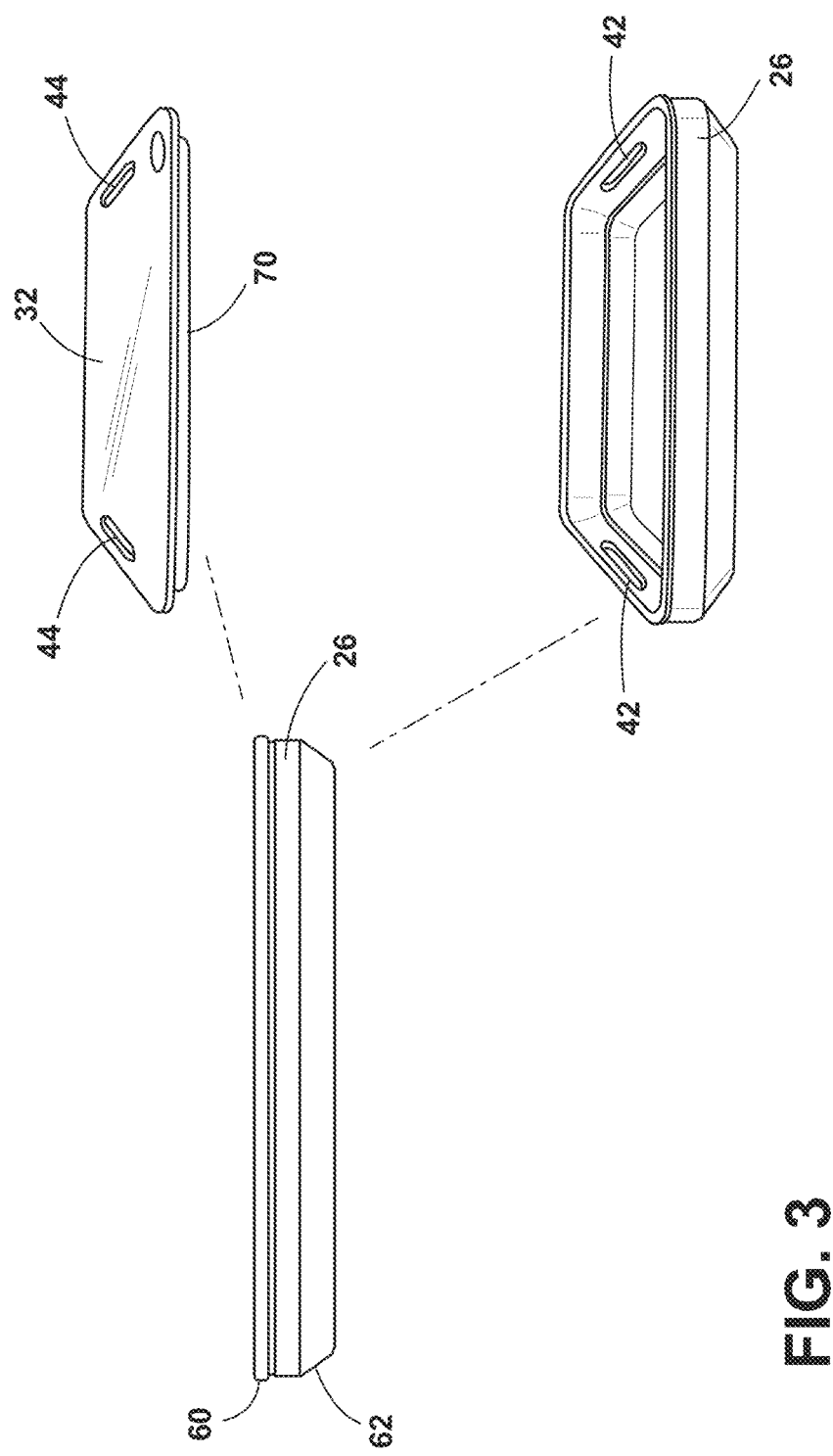
FIG. 3 is a front exploded perspective view of another embodiment of a non-powered accessory system of the present disclosure.

Depending on the desired needs of a user, the searing pan 30 can be replaced with the cooking stone 32, as shown in FIG. 3. In this instance, the cooking stone 32 is a generally planar member that includes a lower engagement member 70 configured for engagement with the bulbous rim 60 of the drip tray 26. The cooking stone 32 can be made from a variety of hard surfaces, including ceramic, granite, etc.

Figure 4:
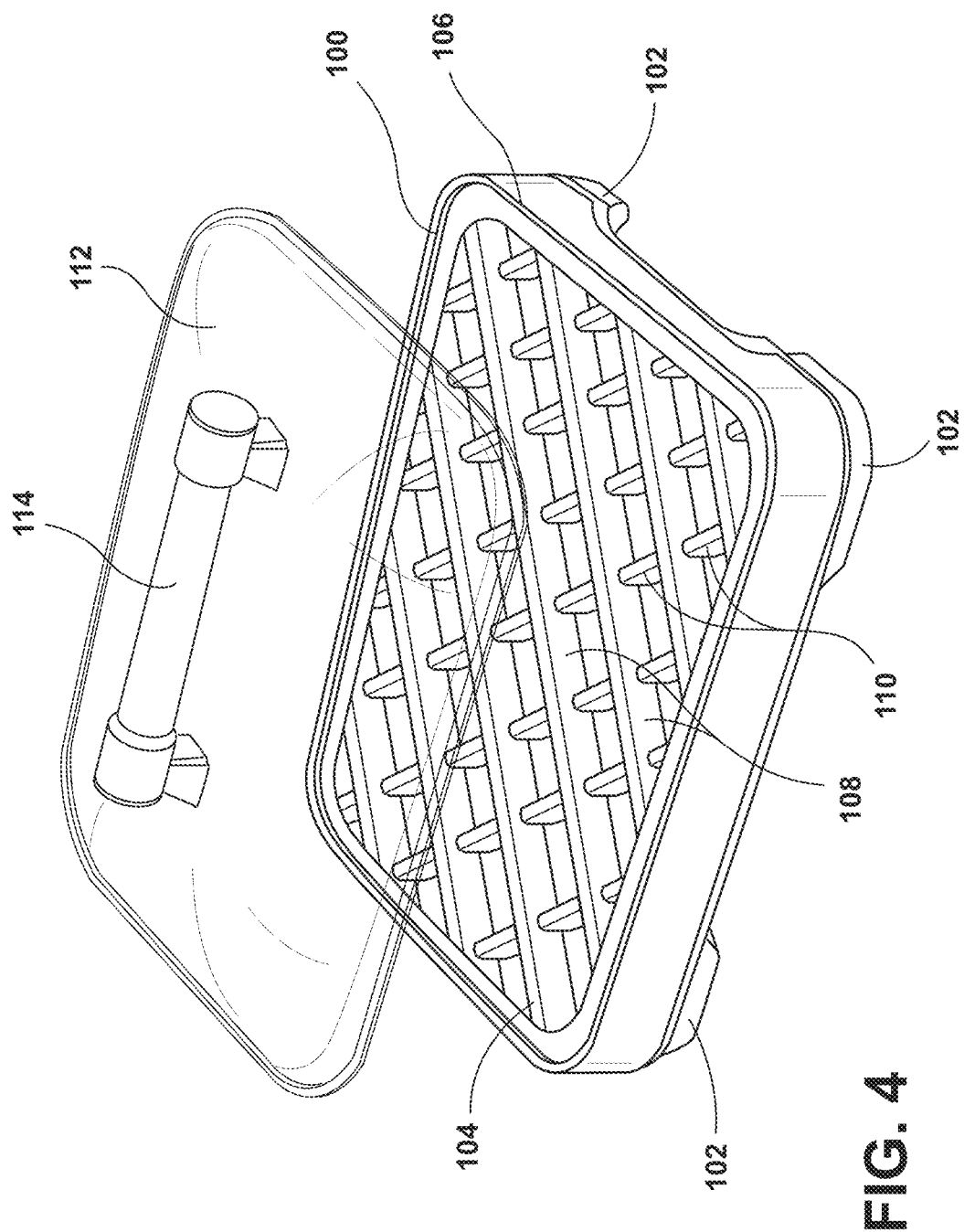
FIG. 4 is a top perspective view of a non-powered accessory system with a cover.

With reference now to FIG. 4, another cooking assembly 10 is illustrated that includes a drip tray 100 having feet 102 at each of four corners of the drip tray 100. The feet 102 can be configured to engage an outside edge of at least one corner of a retention border. In addition, the drip tray 100 is configured to receive a searing pan 104. The searing pan 104 is received within the drip tray 100 and rests slightly below an upper edge 106 of the drip tray 100. This may be accomplished by constructing the searing pan 104 to be slightly shorter than the internal height of the drip tray 100. Alternatively, the searing pan 104 may rest on an inner ledge that supports a cooling surface of the searing pan 104 just below the upper edge 106 of the drip tray 100. In the illustrated embodiment, the searing pan 104 includes a first plurality of searing walls 108 that are parallel and running in a first direction, and a second plurality of searing walls 110 that are parallel and running in a second direction. The first plurality of searing walls 108 stand slightly higher than the second set of searing walls 110, such that a top edge of the first plurality of searing walls 108 is not coplanar with a top edge of the second plurality of searing walls 110. In addition, the illustrated cooking assembly 10 includes a lid 112 constructed from a clear or at least partially clear or partially translucent, polymeric material, and which also includes a handle 114 thereon. The handle 114 may be constructed from a variety of materials, including metal, plastic, etc. It is generally contemplated that the drip tray 100 may be used in conjunction with the grill rack 12 illustrated in FIG. 1. The lid 112 is generally configured to enclose the searing pan 104.

Figure 5:
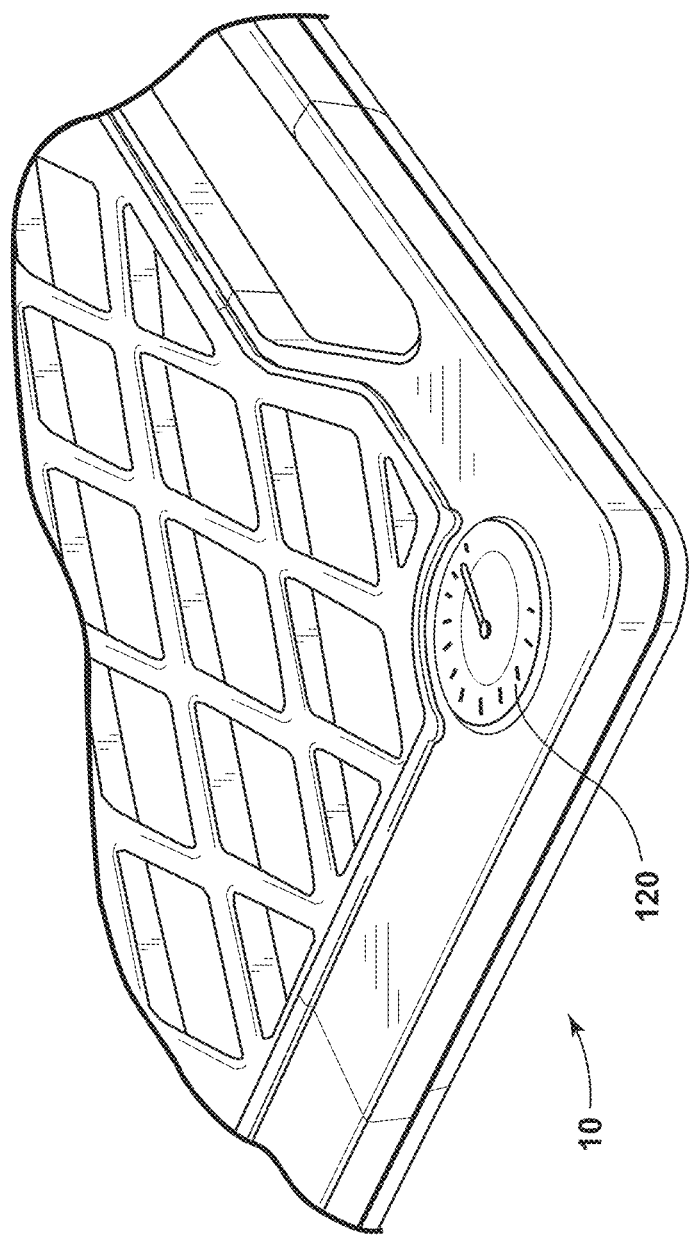
FIG. 5 is a top partial perspective view of a corner of another embodiment of a non-powered accessory system that includes a temperature gauge.

With reference now to FIG. 5, it is generally contemplated that any of the searing pans or cooking stones contemplated for use with the cooking assembly 10 of the present disclosure may include a temperature gauge 120 in a corner thereof. The temperature gauge 120 relays information pertaining to the temperature of the searing pan or cooking stone so a user knows when the appropriate temperature has been met for cooking. It is also contemplated that the temperature gauge 120 may be positioned in a variety of other locations.

Figure 6:
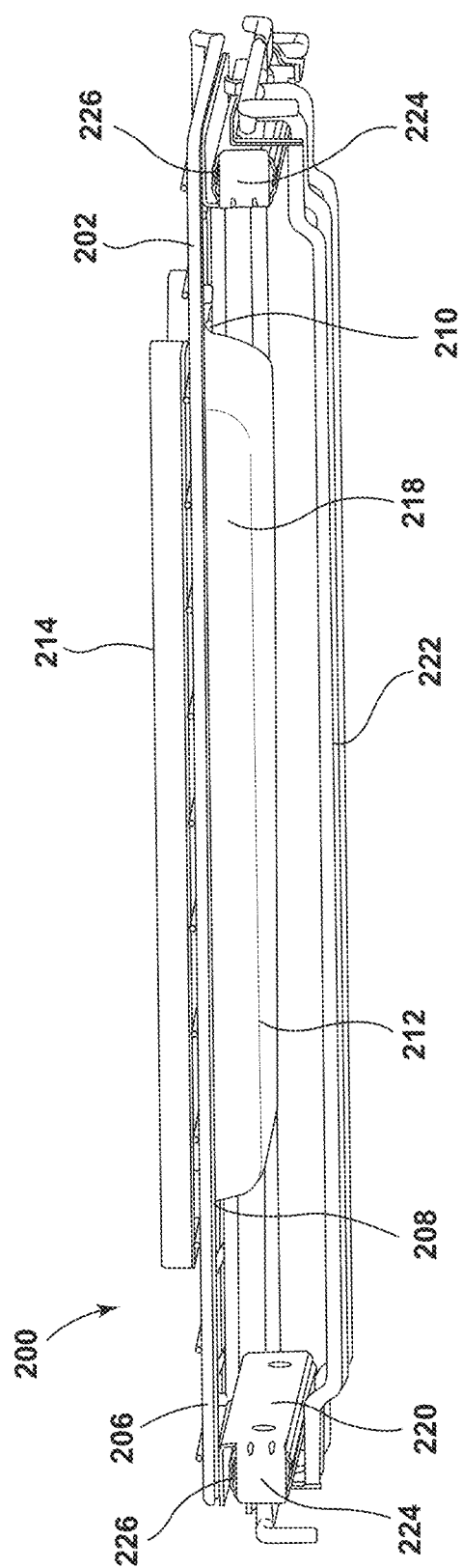
FIG. 6 is a front elevational view of a non-powered accessory system of the present disclosure.
Figure 7:
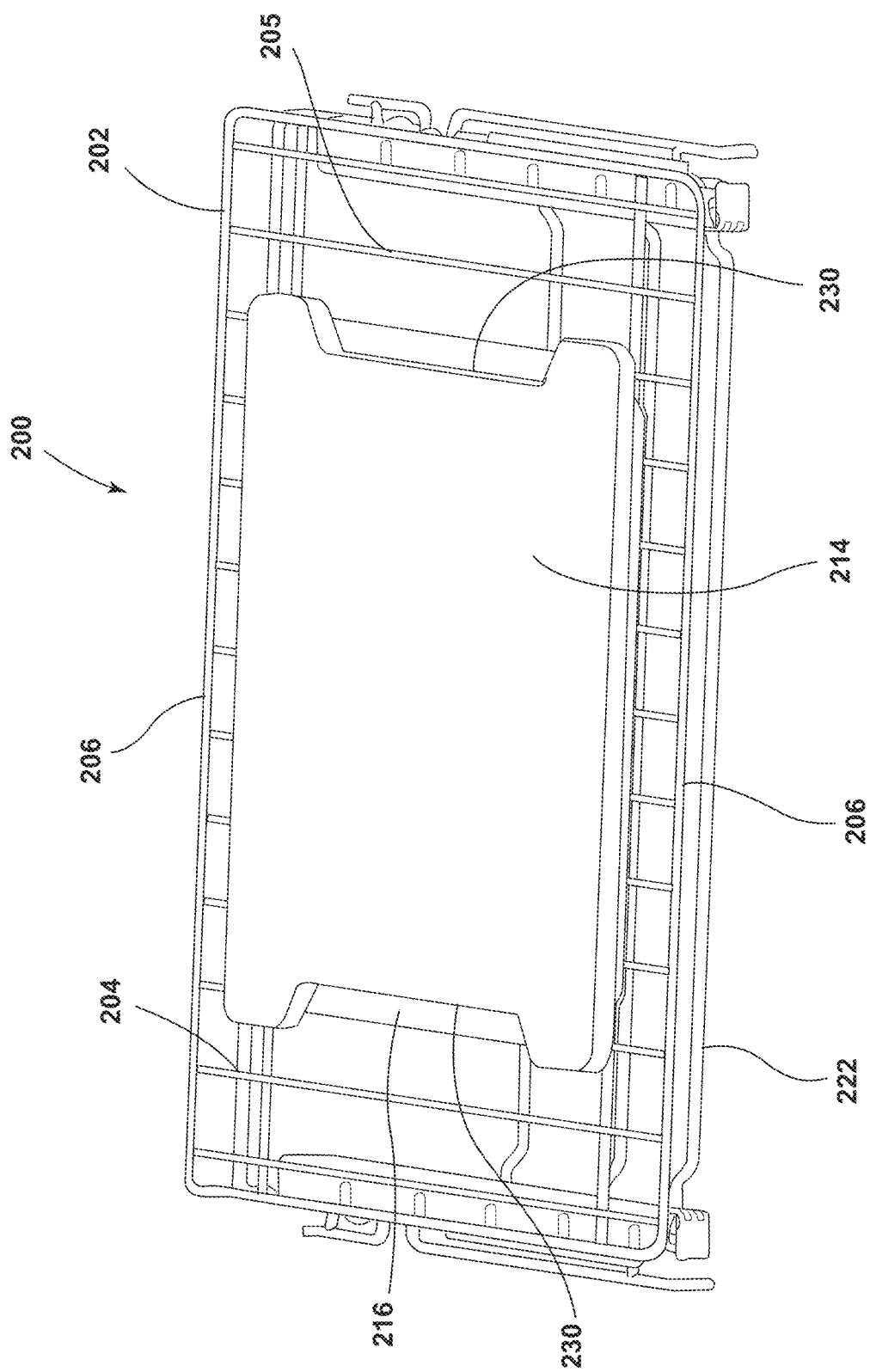
FIG. 7 is a top perspective view of the accessory system of FIG. 6.
Figure 8:
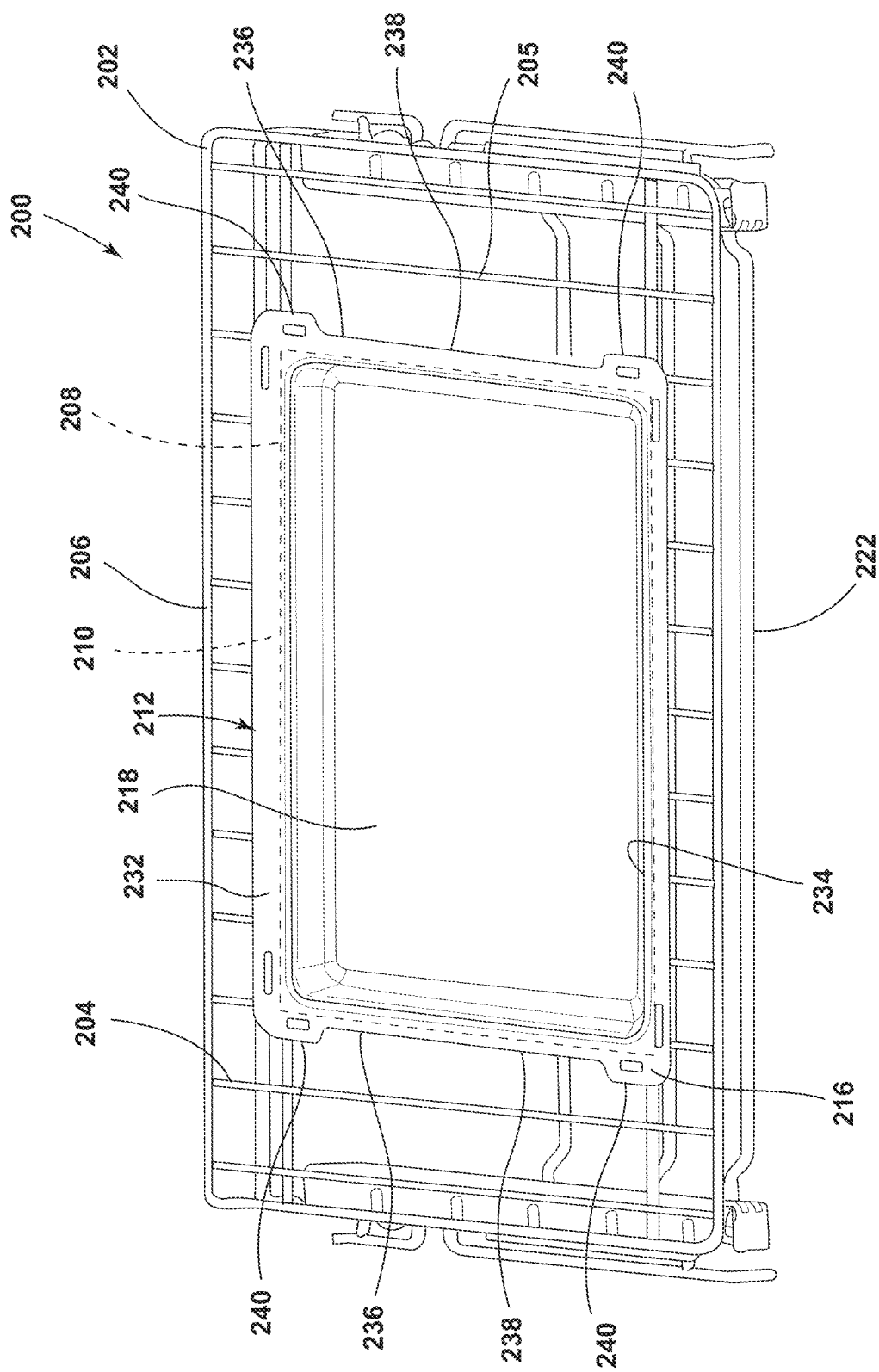
FIG. 8 is a top perspective view of the accessory system of FIG. 7 with the cooking stone removed.

With reference now to FIGS. 6-8, a cooking assembly 200 is illustrated, which includes a grill rack 202 having a planar peripheral portion 204 defined by a plurality of laterally extending wires 205 bound by a peripheral frame 206. The grill rack 202 also includes an inner retention portion 208 defined by a retention border 210. A drip tray 212 is configured to removably engage the retention border 210, thereby securing the drip tray 212 laterally. One of a searing pan and a cooking stone 214 is configured to be received in or on the drip tray 212. The drip tray 212 generally extends into the inner retention portion 208 and includes a peripheral flange 216 that rests on the grill rack 202. The drip tray 212 also includes a well 218 that extends into the inner retention portion 208 below a planar extent of the laterally extending wires 205 of the planar peripheral portion 204. As shown in FIG. 8, drip tray 212 includes a quadrilateral planar peripheral flange 232 that simultaneously engages the four linear portions of quadrilateral retention border 210 of inner retention portion 208 of grill rack 202. The quadrilateral planar peripheral flange 232 of the drip tray 212 has a rectangular inner edge 234 and a pair of outer end edges 236 on opposite sides of the quadrilateral planar peripheral flange 232. Each outer end edge 236 includes a central portion 238 and a pair of spaced-apart tabs 240 that protrude horizontally outward from the central portion 238.

The grill rack 202 is generally configured for use with a rail and slide assembly 220. The rail and slide assembly 220 allows for the grill rack 202 to move relative to a lower support rack 222. The grill rack 202 is fixedly connected with a slide 224 that linearly moves along a rail 226 that may be coupled with an inner wall of an oven. The lower support rack 222 provides rigidity to the system and may also provide additional support to the drip tray 212 even if the drip tray 212 includes a deep well, such that the well rests on the support rack 222. As shown in FIG. 7, the searing pan or cooking stone 214 may include recesses 230 generally defining handle portions, such that the searing pan or cooking stone 214 may be removed from the drip tray 212.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A cooking assembly kit for an oven comprising:
a grill rack including:
   a peripheral portion defined by a plurality of laterally extending wires bound by a peripheral frame; and
   an inner retention portion defined by a plurality of laterally extending wires defining a plane, the inner retention portion including a retention border;
a drip tray configured to removably engage the retention border, thereby securing the drip tray laterally with at least a portion of the drip tray disposed above the plane of the plurality of laterally extending wires of the inner retention portion, the drip tray including a horizontal lower wall and four upright sidewalls extending upwardly above the horizontal lower wall, each upright sidewall having an upper edge having an upwardly facing surface; and
a searing pan and a cooking stone, wherein the searing pan and the cooking stone each include a lower surface and a lower engagement member protruding below the lower surface, wherein the lower surfaces of the searing pan and the cooking stone are configured to interchangeably engage the upwardly facing surfaces of the upper edges of the upright sidewalls, and the lower engagement members of the searing pan and the cooking stone are configured to be interchangeably received in the drip tray and having a cooking surface, whereby the searing pan and the cooking stone can be interchangeably supported by the drop tray, and wherein the searing pan and the cooking stone are configured such that the entire cooking surface is disposed above the upwardly facing surfaces of the upper edges of the four sidewalls of the drip tray and above the plurality of laterally extending wires of the inner retention portion whereby the cooking surface faces upwardly.

2. The cooking assembly kit of claim 1, wherein:
the retention border is disposed above, and in contact with the laterally extending wires of the peripheral portion.

3. The cooking assembly kit of claim 2, wherein:
the retention border is disposed above the laterally extending wires of the inner retention portion.

4. The cooking assembly kit of claim 3, wherein:
the retention border is rectangular in plan view.

5. The cooking assembly kit of claim 4, wherein:
the drip tray has a rectangular lower edge that is disposed inside the retention border when the drip tray is positioned on the grill rack, the retention border including four corners and four linear portions extending linearly between the corners.

6. The cooking assembly kit of claim 4, wherein:
the retention border is planar and includes four corners;
the drip tray includes four corners, each corner having a foot configured to engage an inner side of a corner of the retention border whereby the four feet simultaneously engage the inner sides of the four corners of the retention border when the drip tray is positioned on the grill rack.

7. A cooking assembly comprising:
a grill rack including a planar peripheral portion defining a peripheral plane, the grill rack further including a predefined inner retention portion having a quadrilateral retention border having four linear portions disposed around a quadrilateral opening;
a drip tray configured to engage the predefined inner retention portion of the grill rack, thereby securing the drip tray laterally relative to the grill rack, and wherein the drip tray includes a quadrilateral planar peripheral flange that simultaneously engages the four linear portions of the quadrilateral retention border of the grill rack, the drip tray further including a well that extends into the quadrilateral opening of the predefined inner retention portion of the grill rack, the well extending below the peripheral plane defined by the planar peripheral portion of the grill rack; and
a cooking member configured to be received in the drip tray, wherein the cooking member is selected from the group consisting of a searing pan and a cooking stone, the cooking member including a peripheral portion that is positioned above the quadrilateral planar peripheral flange of the drip tray, wherein the peripheral portion of the cooking member is disposed above the quadrilateral planar peripheral flange of the drip tray and overlaps the quadrilateral planar peripheral flange of the drip tray, the cooking member including an upwardly facing cooking surface that is above the quadrilateral planar peripheral flange of the drip tray such that no portion of the drip tray is above the upwardly facing cooking surface of the cooking member.

8. The cooking assembly of claim 7, wherein:

the four linear portions of the quadrilateral retention border of the grill rack extend linearly between four corners of the quadrilateral retention border of the grill rack, each of the four linear portions of the quadrilateral retention border of the grill rack has an upper surface, wherein all four of the upper surfaces of the four linear portions of the quadrilateral retention border of the grill rack simultaneously contact the quadrilateral planar peripheral flange of the drip tray on four sides of the drip tray along the entire length of the quadrilateral planar peripheral flange of the drip tray.

9. The cooking assembly of claim 8, wherein:

the quadrilateral planar peripheral flange of the drip tray has a rectangular inner edge and a pair of outer end edges on opposite sides of the quadrilateral planar peripheral flange of the drip tray.

10. The cooking assembly of claim 9, wherein:

each outer end edge of the quadrilateral planar peripheral flange of the drip try includes a central portion and a pair of spaced-apart tabs that protrude horizontally outward from the central portion.

11. The cooking assembly of claim 10, wherein:

the tabs define first, second, third and fourth tabs;

the cooking member comprises a cooking stone having a planar upper surface and a peripheral edge having first, second, third, and fourth protruding portions wherein the first protruding portion of the peripheral edge of the cooking stone is disposed directly above the first tab of the quadrilateral planar peripheral flange of the drip tray, the second protruding portion of the peripheral edge of the cooking stone is disposed directly above the second tab of the quadrilateral planar peripheral flange of the drip tray, the third protruding portion of the peripheral edge of the cooking stone is disposed directly above the third tab of the quadrilateral planar peripheral flange of the drip tray, and the fourth protruding portion of the peripheral edge of the cooking stone is disposed directly above the fourth tab of the quadrilateral planar peripheral flange of the drip tray.

12. The cooking assembly of claim 7, including:

a rail and slide assembly including a slide that is linearly movable along a rail coupled to an inner wall of an oven, wherein the grill rack is fixedly connected to the slide.

13. The cooking assembly of claim 9, wherein:

the grill rack includes a peripheral frame; and wherein:

the planar peripheral portion of the grill rack comprises a plurality of laterally extending wires bound by the peripheral frame of the grill rack.

* * * * *